April 10, 1962 H. RICKER 3,029,386

HALF-WAVE VOLTAGE DOUBLING PHASE DETECTORS

Filed March 11, 1957

INVENTOR
HARRINGTON RICKER
BY Elmer J. Gorn
ATTORNEY

United States Patent Office 3,029,386

Patented Apr. 10, 1962

3,029,386

HALF-WAVE VOLTAGE DOUBLING PHASE DETECTORS

Harrington Ricker, Hollis, N.H., assignor to Raytheon Company, a corporation of Delaware Filed Mar. 11, 1957, Ser. No. 645,346
4 Claims. (Cl. 324—87)

This invention relates to half-wave phase detectors and more particularly pertains to an electronic circuit which converts a modulated alternating voltage measuring a signal containing the desired information, here referred to as the error signal, to direct voltage and in addition changes the voltage scale factor of the error signal.

The general property of the electronic circuit is that during one portion of the cycle of a reference voltage certain switches are closed and others are open whereas during the remainder of the cycle, the switch positions are reversed. The circuit provides a D.C. output voltage that indicates the sense as well as the magnitude of the input error signals. The amplitude of the output voltage is roughly proportional to the peak-to-peak amplitude of the input voltage and for zero A.C. input there is zero D.C. output. The circuit employs two terminal unilateral conducting devices (e.g., crystal rectifiers, diodes) as switches; the reference voltage amplitude is large compared to the maximum input signal amplitude so that opening and closing times are functions of the reference voltage waveform alone. The input signal has a periodic waveform of the same frequency as the reference voltage and where the waveforms are sinusoids the reference voltage is in the order of 10 or more times as large as the input signal. The circuit employs an averaging network consisting of a low-pass resistance-capacitance filter to separate the desired output from higher frequency components.

The invention together with its principle of operation and mode of construction may be apprehended by reference to the following description considered in connection with the drawings wherein.

Figure 1:
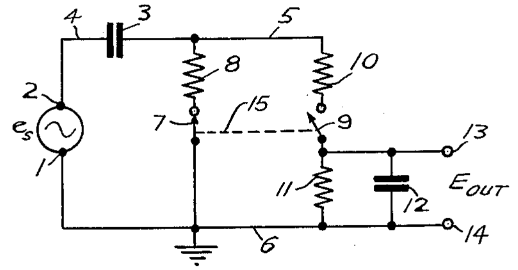
FIG. 1 is an equivalent circuit diagram.
Figure 2:
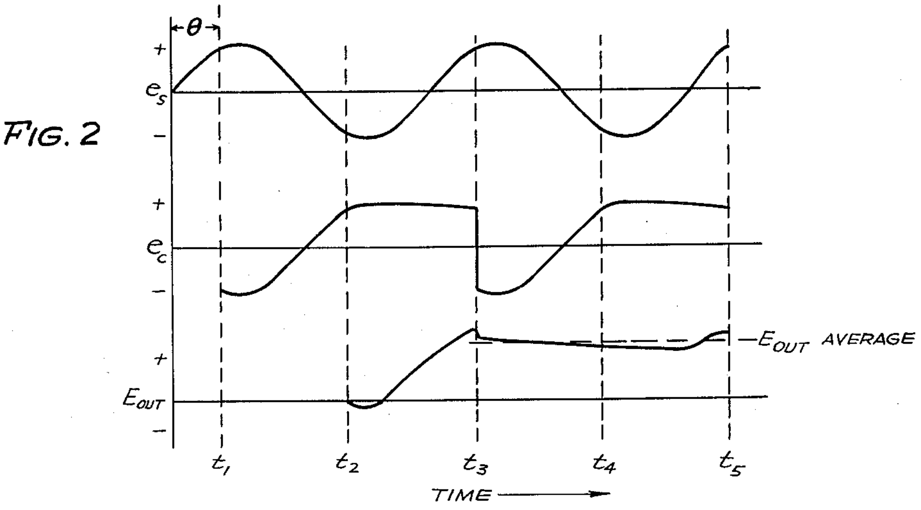
FIG. 2 depicts certain waveforms present during operation of the novel circuit.

Referring now to FIG. 1, there is shown a circuit useful in setting forth the operation of the invention. A signal source $e_s$ is connected across input terminals 1, 2; capacitor 3 has one plate connected through lead 4 to terminal 2; the other plate of capacitor 3 is connected to lead 5; terminal 1 is grounded through lead 6; switch 7 and resistor 8, representing the resistance of the switch, are connected between leads 5 and 6; switch 9 and a resistor 10, representing the switch's resistance, are connected in series with low-pass filter network 11, 12, across leads 5 and 6. The output of the circuit is derived across the resistance-capacitance network 11, 12 through output terminals 13, 14. Switches 7 and 9 are connected by a link 15 so that when one switch is opened the other is simultaneously closed. The resistances 8 and 10 are relatively small. Asume that $e_s$ is a high output impedance source that provides a sinusoidal input voltage as indicated in FIG. 2, and that the positions of the switches are reversed periodically at times $t_1$, $t_2$, etc., at a frequency which is twice the frequency of $e_s$. The symbol $\theta$ indicates the difference in phase between $e_s$ and the signal causing actuation of the switches. Assume further that all capacitors in the circuit are fully discharged, that the switches are initially in the positions shown in FIG. 1, and that the signal $e_s$ is impressed at the time $t_1$. The capacitor 3 will at time $t_1$ until time $t_2$ be connected to ground through switch 7 and resistor 8 and the charge across the capacitor 3 will closely follow the applied voltage $e_s$. The capacitor 3, of course, will charge in a direction such that its charge opposes the applied voltage as indicated in FIG. 2 by the waveform $e_c$ between times $t_1$ and $t_2$. At time $t_2$ the positions of switches 7 and 9 are reversed and capacitor 3 is connected through switch 9 and resistance-capacitance network 11, 12 to ground, switch 7 then being open. Between time $t_2$ and $t_3$ the signal voltage $e_s$ changes from a negative polarity to a positive polarity. At time $t_3$ the voltage across resistance-capacitance network 11, 12 is the algebraic sum $E_{out}$ of the charge $e_c$ on the capacitor 3 and the signal voltage $e_s$. The positions of the switches at time $t_3$ are again reversed and condenser 12 then commences to discharge slowly through resistor 11 as indicated by the waveform $E_{out}$ between $t_3$ and $t_4$. It can be seen that, due to the action of subsequent cycles, voltage $E_{out}$ will consequently assume an average D.C. value which is related to the phase difference $\theta$ and the peak-to-peak voltage amplitude of the input signal $e_s$, the sense of the phase difference $\theta$ determining the polarity of the D.C. output.

Figure 3:
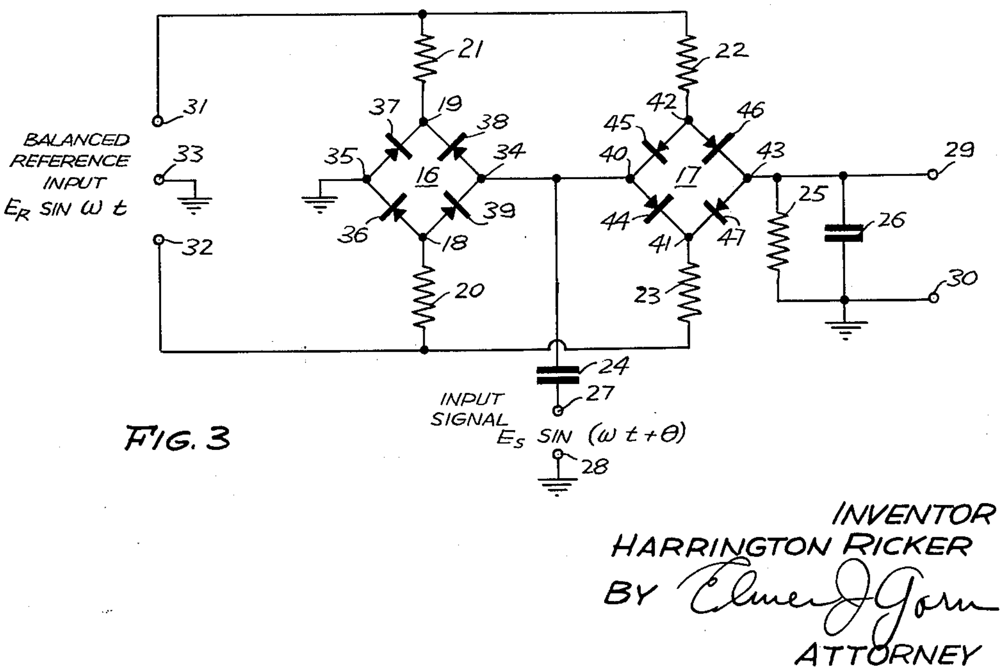
FIG. 3 illustrates a preferred embodiment of the invention.

FIG. 3 is a schematic showing of the invention. The crystal rectifier bridges 16 and 17 are analogous to switches 7 and 9. Each of the bridges comprises four crystal rectifiers (diodes or other unilaterally conducting devices may be employed) arranged as shown in FIG. 2. Bridge 16 conducts current from terminal 18 toward terminal 19 as symbolically indicated by the arrowheads which denote the direction in which the crystal rectifier permits current conduction. Bridge 17 is arranged to conduct current in the direction opposite to the current conduction of bridge 16. Resistors 20, 21, 22 and 23 are preferably of equal value and that value is large (by an order of magnitude of 100 or more) compared to the forward resistance of a crystal rectifier. Capacitor 24 corresponds to capacitor 3 of FIG. 1 and resistance-capacitance network 25, 26 corresponds to the network 11, 12 of FIG. 1. The input to the circuit of FIG. 3 is applied at terminals 27, 28 and the output is taken across terminals 29, 30. A sinusoidal input signal $$E_s \sin (\omega t+\theta)$$

is impressed across the input terminals, where $\omega t$ is the angular frequency, $\theta$ is the phase difference between the signal $e_s$ and a reference signal, and $E_s$ is the maximum voltage amplitude of $e_s$. Switching of bridges 16 and 17 is caused by a balanced reference signal $$E_R \sin \omega t$$

applied to terminals 31, 32 and 33, the latter terminal being grounded. The maximum voltage amplitude $E_R$ of the reference signal is large compared to the maximum input signal amplitude $E_s$ so that the switching time of the bridges is a function of the reference voltage waveform alone. It is to be observed that, when bridge 16 is closed (conducting), points 34, 35, 19 and 18 are effectively clamped at ground potential due to the low forward resistances of the rectifiers 36 to 39 compared to the large voltage drops across resistors 20 and 21. Similarly, when bridge 17 is closed (conducting), points 40, 41 and 42 are effectively clamped to point 43 due to the low forward resistances of rectifiers 44 to 47 compared to the large voltage drops across resistors 22 and 23. Any or all of resistors 20 to 23 may be made adjustable to insure balancing of the circuit. An analysis of the operation of the circuit of FIG. 3 would proceed in a manner quite similar to the analysis of the equivalent circuit of FIG. 1. During the half cycle of the balanced reference signal when the bridge 16 is caused to conduct and bridge 17 is held nonconducting, the capacitor 24 is connected to ground through the low impedance of bridge 16 and the charge $e_c$ across capacitor 24 closely follows the applied voltage $e_s = E_s \sin(\omega t + \theta)$. During the succeeding half cycle of the balanced reference signal, bridge 16 is held nonconducting and bridge 17 conducts whereby the input signal source connected between terminals 27, 28, and capacitor 24 are placed in series with the resistance-capacitance parallel network 25, 26. The impedance of the parallel network is sufficiently high to prevent capacitor 24 from discharging at a rapid rate and hence the capacitor 24 tends to retain its charge near the level it had acquired at time $t_2$. Because the input signal source and capacitor 24 are placed in series with a relatively high impedance, the algebraic sum of the applied signal voltage $e_s$ and the voltage across capacitor 24 is impressed across the parallel network 25, 26 causing the charge across capacitor 26 to follow the summed voltages until time $t_3$ when the reference signal again causes bridge 17 to be held nonconducting. Subsequently, capacitor 26 slowly discharges through resistor 25 causing a voltage $E_{out}$ to appear across terminals 29, 30. The output derived across terminals 29, 30 of FIG. 3 is a D.C. voltage approximately equal to the product of the peak-to-peak value of the input signal voltage $e_s$ and the phase difference $\theta$ between the reference voltage and the input signal.

This invention is not limited to the particular details of construction, materials and processes described, as many equivalents will suggest themselves to those skilled in the art. It is accordingly desired that the appended claims be given a broad interpretation commensurate with the scope of the invention within the art.

What is claimed is:

1. A phase detector comprising first and second unilaterally conductive bridges arranged to conduct current in opposite directions, periodic reference signal means connected to said bridges for causing one of said bridges to conduct and simultaneously causing the other of said bridges to become non-conductive, a storage capacitor, an input signal source, means serially connecting said first bridge and said storage capacitor and said input signal source to form a complete circuit only when said first bridge is conducting, a resistance-capacitance parallel network, means serially connecting said second bridge and said parallel network and said input signal source and said storage capacitor to form a complete circuit only when said second bridge is conducting, and means for deriving an output signal across said network.

2. A phase detector comprising first and second switches, each of said switches being constituted by a unilaterally conductive bridge, a source of periodic reference signals connected to each bridge for concurrently causing the first of said bridges to become non-conductive and the second of said bridges to become conductive, an input signal source, a storage capacitor, means serially connecting said input signal source and said storage capacitor and said first bridge to form a complete circuit only when said first bridge is conducting, a resistance-capacitance parallel network, means serially connecting said second bridge and said network and said input signal source and said storage capacitor to form a complete circuit only when said second bridge is conducting, and means for deriving an output signal across said network having an amplitude which is substantially equal to the amplitude of said input signal source.

3. A phase detector comprising first and second switches, each of said switches being constituted by four unilateral conductive devices forming a bridge, a source of periodic reference signals, means for impressing said reference signals upon said switches for concurrently causing one of said switches to open and the other switch to close, an input signal source, a storage capacitor, means connecting said first switch in series with said storage capacitor and said input signal source to form a complete circuit only when said first switch is closed, a resistor in parallel with a capacitor forming a network, means serially connecting said second switch in series with said network and said storage capacitor and said signal source to form a complete circuit only when said second switch is closed, and means for deriving an output signal across said network having an amplitude which is substantially equal to the amplitude of said input signal source.

4. A voltage doubling phase detector comprising first and second switch means, a source of periodic reference signals for simultaneously causing one of said switch means to open and the second of said switch means to close, a source of input signals, a storage capacitor connecting said input signal source to said first and second switch means, a resistance-capacitance parallel network connected in series with the second of said switch means and said signal source whereby when the first of said switches is closed said storage capacitor is connected across said input signal source and when the second of said switches is closed said storage capacitor is placed in series with said network, and means for deriving an output signal from said network.

References Cited in the file of this patent

UNITED STATES PATENTS

| | | |
|---|---|---|
| 1,929,216 | Pfannenmuller | Oct. 3, 1933 |
| 2,820,143 | D'Nelly et al. | Jan. 14, 1958 |
| 2,829,251 | Patton | Apr. 1, 1958 |

FOREIGN PATENTS

| | | |
|---|---|---|
| 697,692 | Great Britain | Sept. 30, 1953 |